United States Patent [19]
Walters

[11] Patent Number: 4,853,708
[45] Date of Patent: Aug. 1, 1989

[54] INK CARTRIDGE AND HOUSING CONSTRUCTION FOR MULTICOLOR INK JET PRINTING APPARATUS

[75] Inventor: Michael A. Walters, Kettering, Ohio

[73] Assignee: Eastman Kodak Company, Rochester, N.Y.

[21] Appl. No.: 163,491

[22] Filed: Mar. 3, 1988

[51] Int. Cl.$^4$ .................... G01D 15/18
[52] U.S. Cl. .................... 346/75; 396/140 R
[58] Field of Search .................... 346/75, 140 R

[56] References Cited

U.S. PATENT DOCUMENTS 4,591,875 5/1986 McCann .................... 346/75
4,760,408 7/1988 Kanayama .................... 346/140 R

*Primary Examiner*—E. A. Goldberg
*Assistant Examiner*—Gerald E. Preston
*Attorney, Agent, or Firm*—John D. Husser

[57] ABSTRACT

An ink cartridge interface system for multicolor ink jet printing apparatus of the kind having discrete, different color, continuous ink jet circulation subsystems. Each cartridge has a key system component, formed on one of its wall elements at a location for interfitting with a printer housing key system component, and is constructed to have a shape that uniquely identifies the color of ink within said ink cartridge. The printer has a plurality of separate housings each with a different key system component designed to interfit with its particular ink color cartridge.

6 Claims, 5 Drawing Sheets

FIG. 5
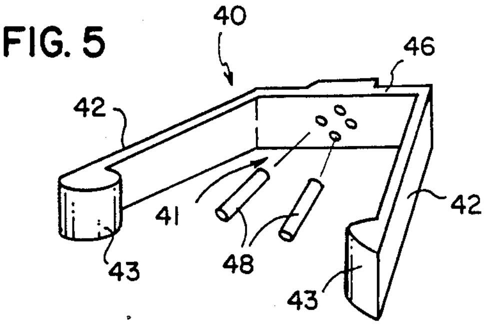
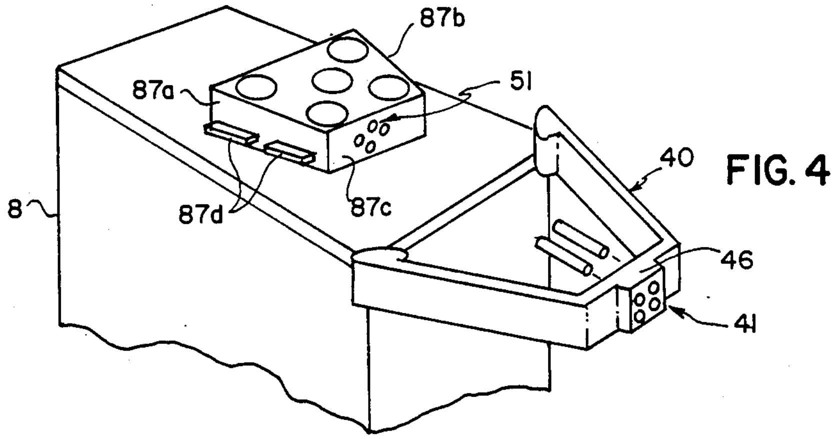
FIG. 4
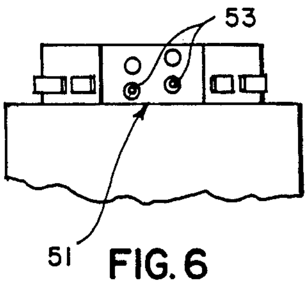
FIG. 6
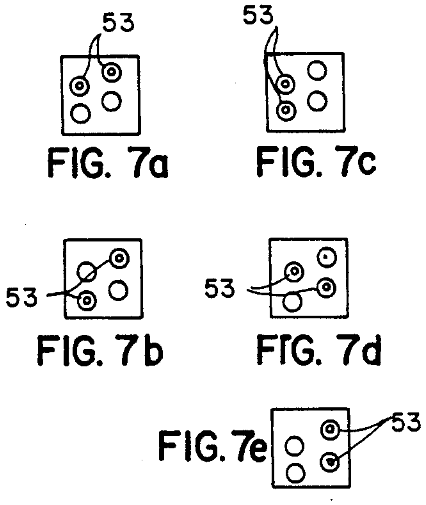
FIG. 7a
FIG. 7c
FIG. 7b
FIG. 7d
FIG. 7e

INK CARTRIDGE AND HOUSING CONSTRUCTION FOR MULTICOLOR INK JET PRINTING APPARATUS

BACKGROUND OF THE INVENTION

1. Field of the Invention

The present invention relates to multicolor ink jet printers of the continuous type and more particularly to cooperative ink cartridge and printer housing constructions which assure that different ink supplies are coupled to different color ink circulation systems with the proper ink-color relation.

2. Background Art

In continuous ink jet printing apparatus streams of uniformly spaced ink drops are created by imposing predetermined vibrations upon liquid ink filaments issuing from an orifice plate. The filaments are formed by supplying ink under pressure to a print head cavity that is in communication with the orifice plate. Information is imparted to the droplet streams by selective non-charging or charging and deflection of droplets. A portion of the droplets pass to the recording medium but there are a substantial number of non-printing droplets that are intercepted by a catcher for recirculation. Often the print head cavity has an outlet other than the orifice plate (e.g. to facilitate dynamic pressure control within the cavity at start-up), and the apparatus ink supply system also circulates such ink flow. In many applications there are a variety of other fluid couplings to the ink reservoir that may be useful.

U.S. Pat. No. 4,591,875 discloses a highly useful ink-cartridge/printer-housing system which enables convenient and cleanly replenishment of the ink supply to such printers, by casual operators in contrast to service specialists. In general, this system provides: (i) an ink cartridge having a plurality of parts (e.g. ink supply and ink return ports), each having valve elements that are biased to a closed condition, and (ii) a printer-housing having a corresponding plurality of ink circulation system terminals that are biased to a closed condition. The cartridge valves and housing terminals are mutually actuatable to an open condition by engaging movements of a cartridge being inserted into the housing.

The replaceable ink cartridge approach of the above noted U.S. Pat. No. 4,591,875 can be used in printer systems having multicolor printing capabilities. For example, a continuous ink jet printer can have a plurality of separate ink circulation systems respectively handling a plurality of different ink jet print heads that print respectively with different ink colors. From the viewpoints of printer simplicity and economy of manufacture, it is highly desirable that the ink cartridges and printer housing constructions of such discrete different color ink circulation systems be identical. This allows the same operator function for replacement of each ink color and minimizes the number of different kinds of parts to be fabricated and assembled.

However, a potential problem has been observed in the use of such a multicolor ink cartridge printer. Specifically, an operator has the capability to insert an ink cartridge of one color into cooperation with the circulation system for a print head of another color ink. This can have a relatively disasterous effect, viz. the mixing of different ink colors, and must be remedied before further printing can proceed, by a service call to remove, or completely purge, the contaminated ink circulation system.

SUMMARY OF THE INVENTION

One significant purpose of the present invention is to provide ink-cartridge and printer housing constructions which retain the advantages of: (i) clean and easy operator ink replenishment and (ii) simple and economic printer/cartridge fabrication, while obviating the potential for ink systems contamination with the wrong color ink.

Thus an important advantage of the present invention is the capability for using common fabrications (e.g. moldings) for different color ink systems, but still preventing improper ink cartridge insertions into the system.

Another advantage of the present invention is the provision of a cartridge-identity construction which cooperates both in cartridge filling and cartridge use to assure that proper color inks are delivered into the different color ink circulation systems of multicolor printers.

Another advantage of the present invention is that its simple constructions provide positive mechanical blockage to accidental operator mis-insertion of ink cartridges.

In one aspect the present invention constitutes an ink cartridge for use with multicolor continuous ink jet printers of the kind having a plurality of ink circulation subsystems each including an ink supply means for feeding ink to a print head assembly and ink return means for returning ink from the print head assembly. The ink cartridge comprises side, top and bottom wall means which form an ink supply and return reservoir; ink supply and return ports constructed and located for respective engagements with the supply and return means of the printer circulation subsystems; and a key system component, formed on one of the wall means of the cartridge at a location for interfitting with a mating key system component in the printer and constructed to have a shape that uniquely identifies the color of ink within the ink cartridge.

In another aspect the present invention constitutes an improved cartridge interfacing construction for multicolor ink jet printers of the kind having separate, ink circulation subsystems. The cartridge interface construction comprises a plurality of housing means for positioning respective ink cartridges in a predetermined location within the printer; a plurality of ink supply and return conduit pairs, each located at a predetermined location relative to one of the housing means; and a plurality of key system components, each formed within one of the housings and each having a different configuration constructed to interfit uniquely with a particular color ink cartridge.

BRIEF DESCRIPTION OF THE DRAWINGS

The subsequent description of preferred embodiments refers to the attached drawings wherein:

FIGS. 4 and 5 are enlarged perspective views showing the details of one preferred embodiment of cartridge/housing key system construction in accord with the present invention; and FIGS. 6 and 7 are diagrams illustrating various exemplary interfit relations possible with the key system shown in FIGS. 4 and 5.

DETAILED DESCRIPTION OF THE PREFERRED EMBODIMENTS

Figure 1:
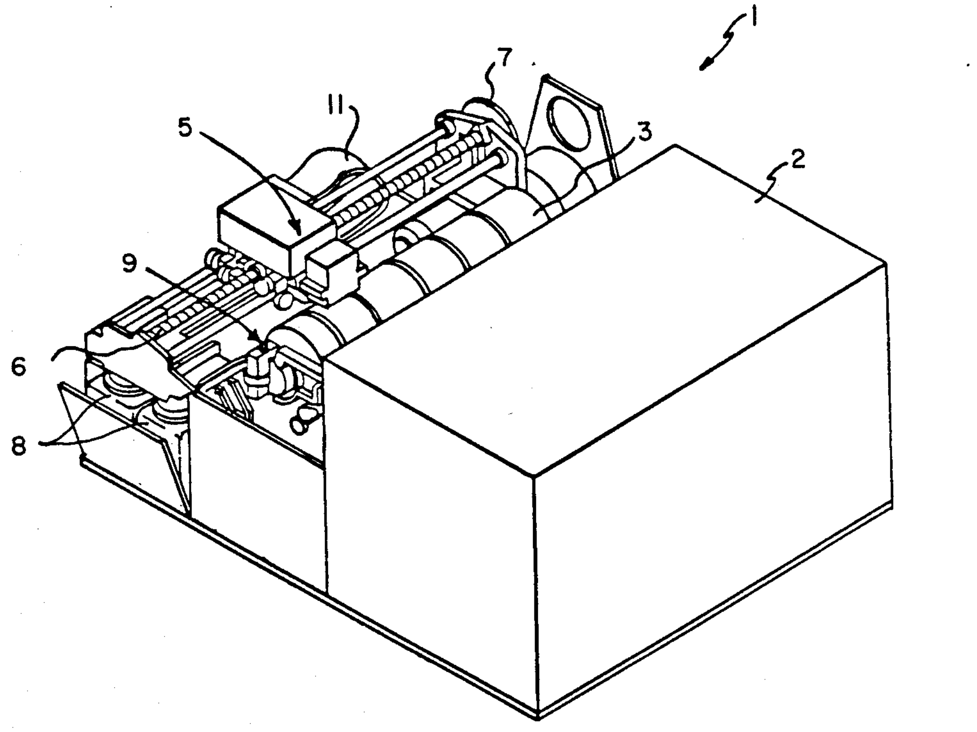
FIG. 1 is a perspective view of one ink jet printing apparatus in which the present invention is useful.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components do not constitute an essential part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to ink supply cartridges 8. A storage and start-up station 9 is constructed adjacent the left side (as viewed in FIG. 1) of the operative printing path of print head assembly 5 and the drive means 7 and carriage assembly 6 are constructed to transport the print head assembly into operative relations with station 9 at appropriate sequences of the apparatus cycle.

Figure 2:
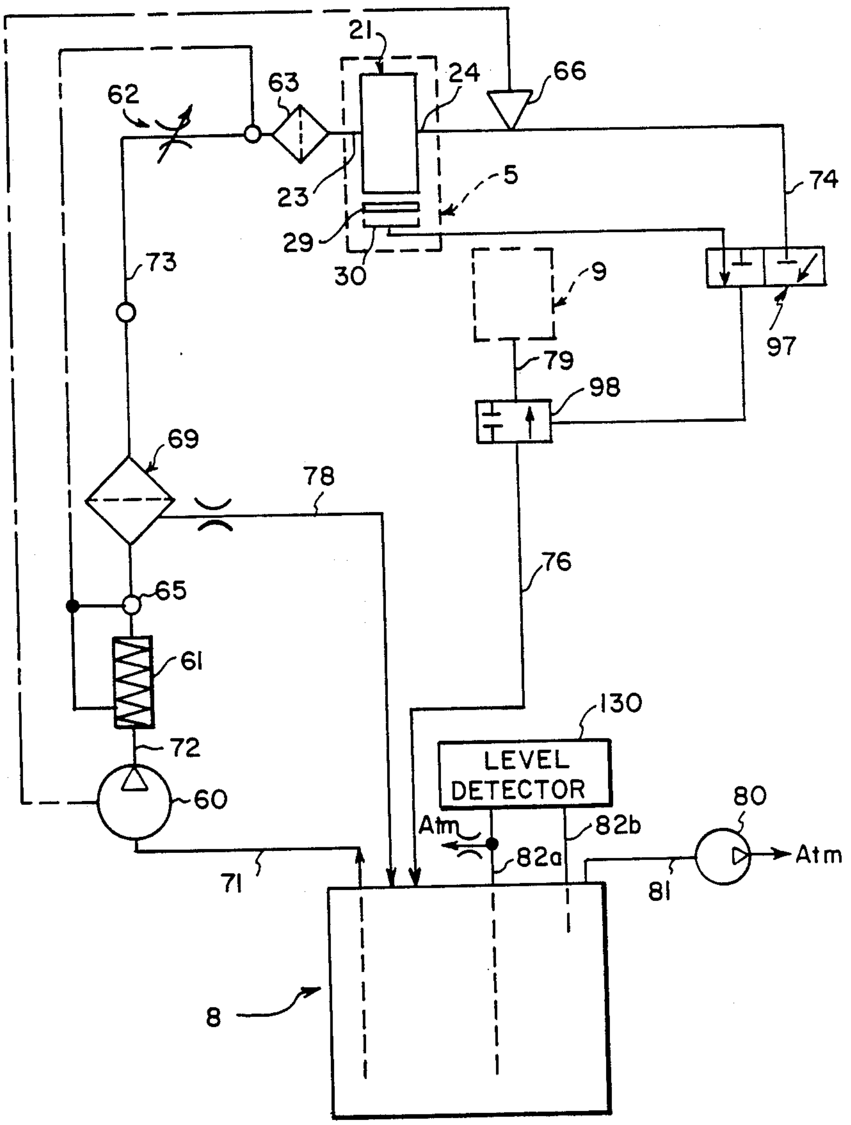
FIG. 2 is a diagram of one of the ink circulation systems of the FIG. 1 printer.

The schematic diagram of FIG. 2 shows one of the discrete ink circulation and printing systems of the FIG. 1 printer. The print head assembly 5 of that system includes an upper portion including a print head body, having an inlet, a cavity communicating with an orifice plate and a print head outlet. The upper print head portion also includes a suitable transducer means to assure break-up of the ink filaments into streams of uniformly spaced ink droplets. The lower portion of print head assembly 5 includes a charge plate constructed to impart desired charge upon ink droplets and a drop catcher constructed and located to catch non-printing droplets.

The ink supply and circulation system shown in FIG. 2 includes various ink conduits, or "lines", which form the ink circulation path. Specifically, pump inlet line 71 extends from ink supply cartridge 8 to the inlet of pump 60, pump outlet line 72 extends between pump 60 and main filter 69, head supply line 73 extends from main filter 69 to the print head inlet and head return line 74 extends from the print head outlet to a junction via three-way solenoid 97 between catcher return line 75 and the main ink return line 76. The main return line 76 is also connected via solenoid 98 to home station return line 79. A line 78 extends from main filter 69 back to cartridge 8. A vacuum pump 80 is coupled to the cartridge interior via conduit 81. As will be clear from the subsequent description, the present invention is not limited to use with the particular ink circulation line arrangement shown in FIG. 2. Other elements of the FIG. 2 embodiment such as ink heater 61, variable flow restrictor 62, final filter 63, temperature sensor(s) 65 and pressure sensor 66 can be usefully incorporated within the ink circulation system.

Figure 3A:
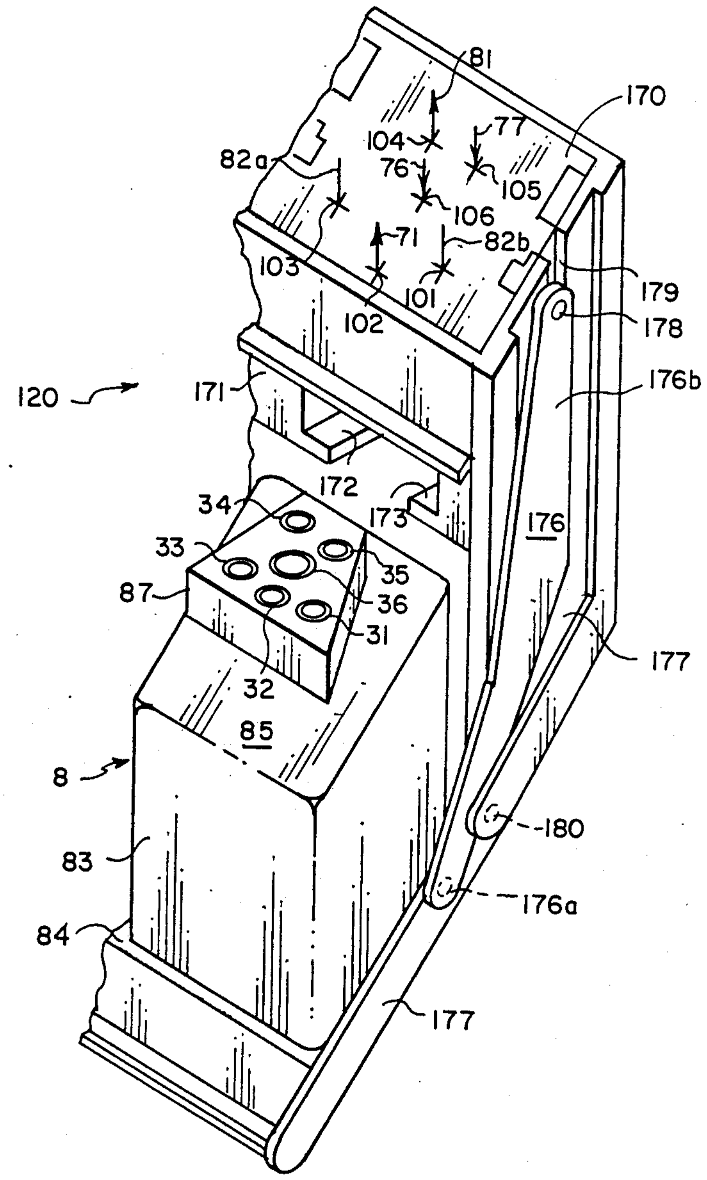
FIGS. 3*a* and 3*b* are respectively perspective, assembled and exploded, views of one ink-cartridge/printer-housing construction in which the present invention can be embodied.

Referring to FIG. 3*a*, the cartridge 8 is constructed to be readily inserted and removed, as a unit, from operative relation with lines of the ink circulation system. More particularly, the cartridge 8 comprises side walls 83, bottom wall 84 and a top wall 85 which define an enclosed ink supply/return reservoir. The top wall of the cartridge has a raised portion denoted generally 87 in which are formed ports 31, 32, 33, 34, 35 and 36, each providing a fluid path from the cartridge exterior to the supply/return reservoir within the cartridge. Those ports respectively have mounted therein valve members, such as described in U.S. Pat. No. 4,591,875, which are biased to a closed position. The cartridge valve members each have female portions that are adapted to interfit with a male portion of a printer conduit terminal to provide a coupling that effects a sealed passage into the cartridge.

The cartridge embodiment shown in FIG. 3*a* is designed to cooperate with the fluid system shown in FIG. 2. Thus, port 32 is intended for coupling to pump inlet line 71, port 36 is intended for coupling to return line 76, port 35 is intended for coupling to filter return line 78, port 34 is intended for coupling to vacuum line 81 and ports 33 and 34 are intended for coupling to level sensor lines 82*a* and 82*b*.

To accomplish insertion and removal of the cartridge 8 into and from operative relation with the printer's fluid handling system, the cartridge and interface structure of the printer are provided with a number of cooperative features. Thus each of the printer conduits that are to be coupled to the cartridge 8 have male terminals that are constructed to interfit in a sealed fluid communication with the valved ports of the cartridge. Specifically, terminal 102 (for supply conduit 71) is adapted to mate with valved port 32, terminals 101 and 103 (for sensor conduits 82*a* and 82*b*) are adapted to mate with valved ports 31 and 33, terminal 106 (for return conduit 76) is adapted to mate with valved port 36, terminal 104 (for vacuum conduit 81) is adapted to mate with valved port 34 and terminal 105 (for conduit 78) is adapted to mate with valved port 35.

The respective cartridge valves and conduit terminals and their engagement and disengagement are effected by cooperative alignment structures on the cartridge and on the cartridge interface portion of the printer's cartridge housing. Specifically, the raised portion 87 of cartridge 8 includes longitudinal alignment edges 87*a* and 87*b* (see FIG. 4) which taper together in the direction of an abutment edge 87*c*. In addition, each of the longitudinal edges is provided with a recessed lifting lip, e.g. formed by flanges 87*d*.

The cartridge interface construction of the printer is provided in cartridge housing 120 of the printer apparatus, FIG. 3*a*. The conduit terminals are located in a top wall 170 of that housing with their cooperative coupling structures facing downwardly so as to be engageable with their respective mating ports in the top of a cartridge that is inserted into the housing. In order to properly align the ports and valve structure of an inserted cartridge with proper terminals and related valve structure of the printer, an alignment and lift member 171 is supported within the housing in a position for engaging the guide and abutment edges of an inserted cartridge. Thus the member includes alignment and engagement flanges 172 and 173 that diverge outwardly to an extent that conforms to the inward taper of the sides of the raised portion of cartridge 8. The flanges 172, 173 are spaced apart a distance such that when the abutment surface 87*c* of a cartridge has been moved into contact with stop surface 174 (see FIG. 3*b*) of the alignment and lift member (as guided by the cooperation of edges 87*a* and 87*b* with the arms 172 and 173), the flanges 172 and 173 are snugly within the recesses below flanges 87*d* of the cartridge.

Figure 3B:
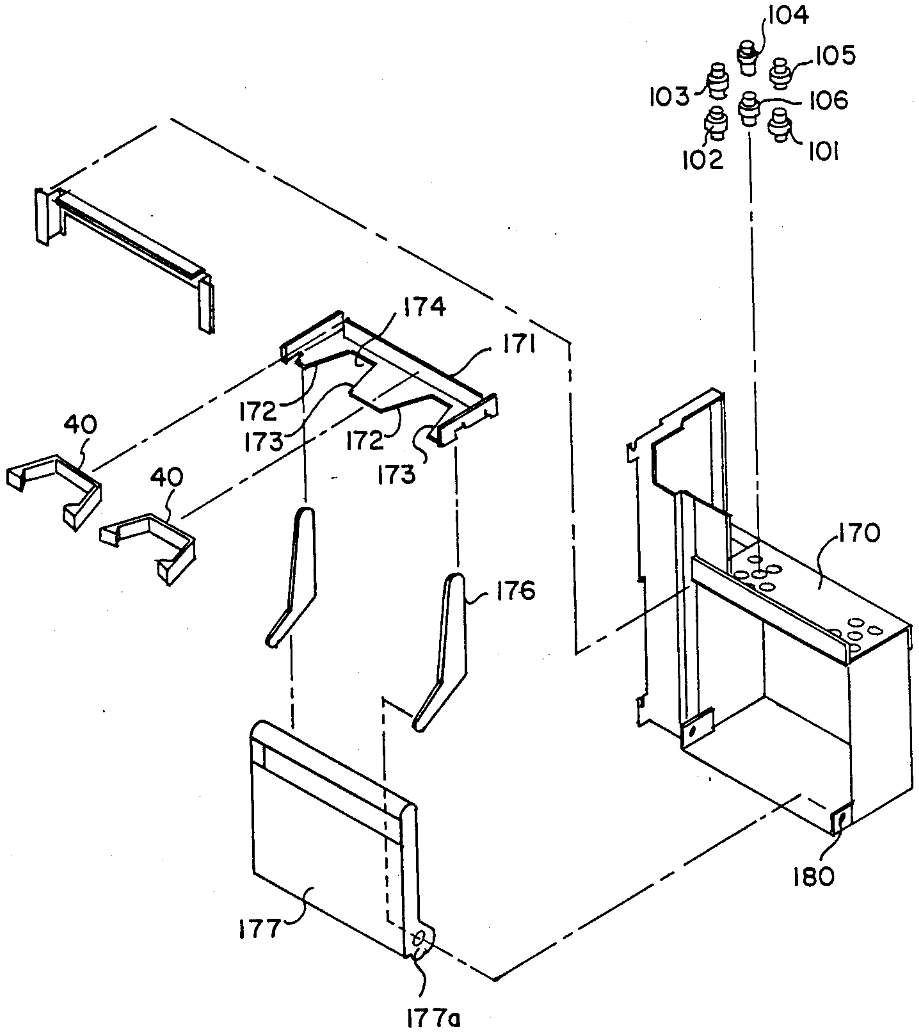

When a cartridge has been fully inserted in the above-described manner, it is properly aligned vis-a-vis the conduit terminals and means for lifting the cartridge into engagement with the terminal can be actuated. One preferred device for effecting this lifting engagement is, as shown in FIGS. 3*a* and 3*b*, a toggle linkage 176 coupling door 177 of the printer's cartridge housing to reciprocatory drive 178, 179 for arms 172, 173. As shown, the toggle linkage 176 is coupled to a flange 177*a* of the door at pivot 176*a* and is adapted to raise the lift arms in response to door closure on its pivot 180 and lower the lift arms in response to the opening of the door. The toggle linkage has an over-center position slightly beyond the uppermost movement of the door movement and thus the uppermost movement of the lift arms.

In operation, a cartridge that has been guided to an aligned position is raised in response to door closure by the raising of linkage 176 due to its coupling at 176*a* with door 177. The female coupling portions of the cartridge ports are thus moved into mating engagement with the male coupling portions of the conduit terminals. The upward movement of the cartridge causes mutual opening of both the cartridge and terminal valves and the final over-center movement of the toggle linkage allows the cartridge to back-off slightly to a position where both valve sets are open. The normal bias of the valve sets retains the toggle linkage in its over-center position which is the normal operative position for printer operation. When it is desired to remove a cartridge the door is opened, moving the cartridge initially upward to pass the over-center position of the toggle linkage and then moving the lift arms downwardly to disengage the cartridge ports from the conduit terminals. This disengagement effects immediate closure of both valve sets so that no ink leakage can occur from either the cartridge or the printer conduits. An empty cartridge can then be removed and replaced with a full cartridge.

Referring now to FIGS. 4 and 5, as well as FIG. 3*b*, it can be seen that, in accord with the present invention, the printer housing has a clip member 40 which has a key system portion (designated generally 41) that is adapted to cooperate with a mating key system portion (denoted generally 51) on the surface 87*c* of the raised portion of cartridge 8. The clip member is formed (e.g. by molding) to comprise arm members 42 having detent ends 43. The arms of clip 40 are flexible and ends 43 are shaped with cam surfaces constructed to flex the arms ourtwardly when the flanges 87*d* of an inserted or removed ink cartridge engage them. Thus referring back to FIG. 3*b*, it can be seen that clips 40 are mounted at the rear of alignment and lift 171 so that a fully inserted cartridge will be fastened, i.e. resiliently detented, by the clip when the abutment surface of cartridge portion 87 contacts stop surface 174 of member 171. This provides a tactile feedback about completion of cartridge insertion and retains the cartridge in proper position during lifting for aligned valve engagements.

Referring back to FIGS. 4 and 5, it can be seen that the key system portion 51 is located on the abutment surface 87*c* of cartridge 8 and that key system portion 41 is located on the rear wall 46 of clip 40. In the illustrated embodiment of the present invention, the key system comprises recess holes molded into the abutment surface 51 and 87*c* of ink cartridge 8 and the rear wall 46 of clip 40. These recess holes are located so as to be in horizontally aligned patterns during insertion of a cartridge into the printer housing. Thus all cartridges and clips can be produced with common molds.

Referring to FIGS. 4 and 5, it is shown how key pins 48 are inserted into predetermined recess holes of clip 40 to encode the clip with the pin pattern representative of the ink color for the ink circulation system to which its cartridge housing is coupled. Similarly, FIG. 6 and FIGS. 7*a* through 7*e* show how plug members 53 can be placed in predetermined recess holes of cartridge portion 51 to encode that cartridge with a particular ink color indicia. For example, the ink cartridge shown in FIG. 6 is not encoded properly for insertion into a clip which is encoded with pins inserted as shown in FIG. 5 (while the cartridge plug encoding shown in FIG. 7*a* is correct for insertion into the FIG. 5 pin-clip key portion.

In operation, an ink cartridge with the FIG. 6 plug configuration will provide positive mechanical feedbacks to an operator attempting to insert it into a cartridge housing encoded with the FIG. 5 key portion. Thus during an attempted insertion the pins 48 will abut plugs 53 of the FIG. 6 cartridge and prevent the cartridge from being moved to a fully inserted and detented position. This will signal the operator that he is attempting to place the wrong ink color into the ink circulation system coupled to that housing. Moreover, because the cartridge cannot be moved to a fully inserted condition, the door of the housing cannot be closed to lift the cartridge into valve opening relation with the housing. Thus, the disasterous effects of introducing the wrong color ink into the circulation system is positively prevented.

To insure that the cartridges 8 contain the ink color corresponding to their plug encoding, it is highly preferred to plug-encode cartridges before filling and to construct the ink dispensing system with proper pin key constructions to enable the dispensing machine to receive only properly encoded cartridges.

It will be appreciated by one skilled in the art that configurations other than holes with pin-plug encodings can be utilized as key system portions. For example, the clip and cartridges can have differently molded mating configurations for different colors. This diminishes the advantage of common molding, but reduces subsequent pin/plug insertion operations. Also, it will be appreciated that the key system portions can be located on portions of the cartridge other than described above, with appropriate shifts of construction in the cartridge housing key system portion.

The invention has been described in detail with particular reference to preferred embodiments thereof, but it will be understood that variations and modifications can be effected within the spirit and scope of the invention.

I claim:

1. For use with multicolor continuous ink jet printing apparatus of the kind having: (i) a plurality of ink circulation subsystems, each including an ink supply means for feeding ink to a predetermined print head assembly and ink return means for returning ink from that print head assembly and (ii) a cartridge housing, an ink cartridge comprising:

(a) side, top and bottom wall means forming an ink supply and return reservoir;

(b) means in one of said wall means for defining an ink supply port and an ink return port which are constructed and located for respective engagements with the supply and return means of such circulation subsystems; and (c) a key system component, formed on one of said wall means at a location for interfitting with a printer key system component formed in such cartridge housing, and constructed to have a shape that uniquely identifies the color of ink within said ink cartridge.

2. In multicolor ink jet printing apparatus of the kind having discrete ink circulation subsystems, each including a print head assembly, supply conduit means for supplying ink to said print head assembly and return conduit means for returning ink from said print head assembly, an improved cartridge interface construction comprising:

(a) a plurality of housing means for positioning respective ink cartridges in a predetermined location within said apparatus;

(b) a plurality of supply and return conduit pairs; each respectively located at a predetermined location on said plurality of housing means; and (c) a plurality of key system components, each located within one of said housing means and each having a different configuration respectively constructed to interfit uniquely with a particular color ink cartridge construction.

3. An ink cartridge interface system for a multicolor ink jet printer of the kind having a plurality of discrete ink circulation systems, each including ink supply conduit means and ink return conduit means, said interface system comprising:

(a) a plurality of housing means for positioning respective different color ink cartridges;

(b) supply and return conduit couplings on each of said housing means;

(c) a key system member formed on each of said housings, each such member having a different configuration respectively constructed to interfit uniquely with a particular color ink cartridge construction; and (d) a plurality of ink cartridges, each having (i) side, top and bottom wall means forming an ink supply and return reservoir; (ii) ink supply and ink return ports, said supply and return ports being constructed and located for respective engagements, with the supply and return couplings of said any of said housings; and (iii) a key system member which is formed on one of said wall means at a location for uniquely interfitting with a housing key system member, and which is constructed to have a shape that uniquely identifies the color of ink within said ink cartridge.

4. The invention defined in claim 1 wherein said cartridge key systems components comprises a cartridge portion with a molded recess and plug elements inserted in said recess pattern in a predetermined color code format.

5. The invention defined in claim 2 wherein said key components each comprise a molded cartridge clip element affixed within a respective housing and having a recess pattern with pin elements mounted therein in a predetermined color code format.

6. The invention defined in claim 3 wherein said housing key system members each respectively comprise a different pattern of pin elements and said cartridges key system members each respectively comprise a different pattern of pin receiving recesses.

* * * * *